(12) United States Patent
Berbereia

(10) Patent No.: US 12,538,858 B2
(45) Date of Patent: Feb. 3, 2026

(54) SERVICE HITCH ATTACHMENT

(71) Applicant: Blake Berbereia, Tulare, CA (US)

(72) Inventor: Blake Berbereia, Tulare, CA (US)

( * ) Notice: Subject to any disclaimer, the term of this patent is extended or adjusted under 35 U.S.C. 154(b) by 433 days.

(21) Appl. No.: 18/173,726

(22) Filed: Feb. 23, 2023

(65) Prior Publication Data
US 2023/0263084 A1 Aug. 24, 2023

Related U.S. Application Data

(60) Provisional application No. 63/268,424, filed on Feb. 23, 2022.

(51) Int. Cl.
*A01B 59/06* (2006.01)
*A01B 63/102* (2006.01)

(52) U.S. Cl.
CPC .......... *A01B 59/066* (2013.01); *A01B 63/102* (2013.01)

(58) Field of Classification Search
CPC .......................... A01B 59/066; A01B 63/102
See application file for complete search history.

(56) References Cited

U.S. PATENT DOCUMENTS

| | | | |
|---|---|---|---|
| 1,916,945 A | 7/1933 | Harry | |
| 11,343,954 B2* | 5/2022 | Thorsell | ................. A01B 71/06 |
| 2015/0230388 A1* | 8/2015 | Ribo | .................... A01B 59/064 |
| | | | 248/653 |

FOREIGN PATENT DOCUMENTS

| | | | | | |
|---|---|---|---|---|---|
| CN | 110226377 A | * | 9/2019 | .......... | A01B 59/066 |
| CN | 114073181 A | * | 2/2022 | .......... | B62D 49/065 |
| EP | 3818798 A1 | * | 5/2021 | ............. | A01D 75/30 |

* cited by examiner

*Primary Examiner* — Matthew R Buck
(74) *Attorney, Agent, or Firm* — Gary L. Eastman, Esq.; Eastman IP

(57) ABSTRACT

A mechanical system attaches to a tractor and, upon activation of a hydraulic ram, rotates implement-engaging implement lift hooks to rotate an attached agricultural implement upwards towards 90 degrees for inspection and maintenance. The system can be secured in its raised and rotated position via a locking pin. The implement is returned to its original position through removal of the locking pin, reversal of the hydraulic ram and disconnection of the implement lift hooks.

19 Claims, 9 Drawing Sheets

SERVICE HITCH ATTACHMENT

RELATED APPLICATION

This application claims priority to U.S. Provisional Patent Application Ser. No. 63/268,424 for a "Service Hitch Attachment," filed Feb. 23, 2022, the entirety of which is incorporated herein by reference.

FIELD OF THE INVENTION

The present invention pertains generally to tractor hitch systems. The present invention is particularly, but not exclusively, useful as an extension to a three-point hitch to facilitate servicing of agricultural implements.

BACKGROUND OF THE INVENTION

Modern tractors connect to agricultural implements using a three-point hitch based on a design by Harry Ferguson and described in U.S. Pat. No. 1,916,945. Three-point hitches used today provide a rigid connection using an upper connection point and two lower connection points, and use the tractor's hydraulic system to lift the attached implement to raise it above the ground.

Tractors and three-point hitch systems are generally only able to raise attached implements a short distance above the ground, generally involving tilting the implement to an angle much less than thirty degrees. This limited movement has been sufficient for the intended purpose of avoiding contact between the instrument and the ground when undesirable—e.g., preventing a plough from contact with the ground outside the field being ploughed. Moreover, tractors generally use hydraulic raising, but gravity-based lowering, thus necessitating a limited maximum distance for raising an implement in order to avoid damage to the implement during lowering. Hydraulics are not used for lowering implements on tractors in part because of the potential raising of the tractor wheels with downward hydraulic pressure, resulting in loss of traction. However, implements need inspection and maintenance from time to time, and the limited movement provided by the tractor fails to facilitate convenient servicing.

In view of the above, it would be advantageous to provide an apparatus for facilitating service, including inspection and maintenance, of an agricultural implement. It would be further advantageous to provide an apparatus for facilitating service of agricultural implements that can be easily attached to a tractor using the industry-standard three-point hitch system.

SUMMARY OF THE INVENTION

Disclosed is a service hitch attachment that attaches to a tractor's three-point hitch on one end, and attaches to an agricultural implement on its other end. The service hitch attachment uses the tractor's hydraulics to rotate the attached implement to nearly ninety (90) degrees, exposing the bottom of the implement for easier servicing.

A preferred embodiment of the service hitch attachment includes three connectors on a first side for attachment to a tractor's three-point hitch. A second side opposite the first side includes three lift hook connectors for attachment to an agricultural implement that normally connects directly to the tractor. The two lower lift hooks are horizontally slidable and the upper lift hook is located on a rotatable arm and is vertically slidable, thus allowing the service hitch attachment to work with implements for different categories of three-point hitch.

The rotatable arm is attached to a hydraulic cylinder that connects to the tractor's hydraulic system, thus allowing the rotatable arm to rotate toward and away from the first side of the service hitch attachment, lifting or lowering the attached implement as desired. The maximum rotation of the implement is nearly ninety (90) degrees, allowing for easy inspection and servicing. Preferred embodiments have a maximum rotation of between eighty (80) and ninety (90) degrees, with an approximately eighty-five (85) degree maximum in an exemplary preferred embodiment. When in its maximum inward rotation, the rotatable arm can be secured in its position with a locking pin.

An alternate embodiment includes its own twelve-volt hydraulic power unit to run the hydraulic cylinder, thus enabling it to be attached to a forklift instead of a tractor.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DETAILED DESCRIPTION

Figure 1:
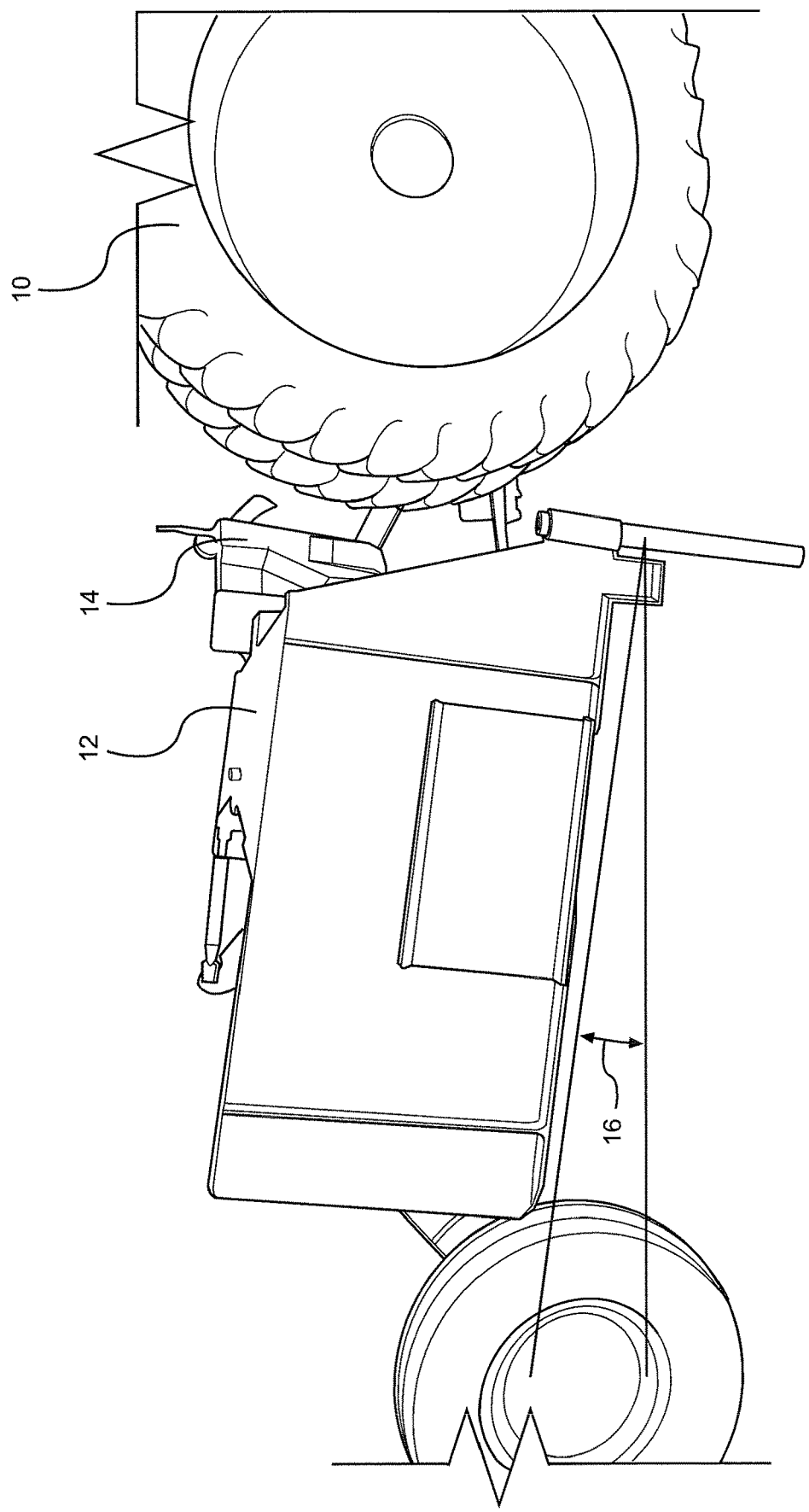
FIG. 1 illustrates an implement raised for servicing with a tractor as practiced prior to the disclosed invention.

Referring initially to FIG. 1, a prior art tractor 10 has raised an implement 12 that is attached to it via hitch 14. The ability of tractor 10 to raise implement 12 via hydraulics was originally conceived for the purposes of avoiding obstacles, turning the tractor around at the edge of a field, and for other situations in which it is not desirable for implement 12 to contact the ground. Accordingly, tractor 10 can only raise implement 12 to a maximum of angle 16, which is generally less than about twenty (20) degrees.

Due to the limited maximum angle 16 to which tractor 10 can raise implement 12, servicing implement 12 either requires specialized equipment and facilities, or is performed at significant risk, discomfort, and inconvenience to the person servicing. The source of the problem of servicing implement 12 or other tractor-connected implements is due to the inability of tractor 10 and hitch 14 to raise a connected implement, such as implement 12, to a sufficiently high angle for convenient servicing. This source of the problem has gone undiscovered until the disclosed invention, as evidenced by the enduring presence of the limitations of tractor 10 and hitch 14 over a period of several decades.

Figure 2:
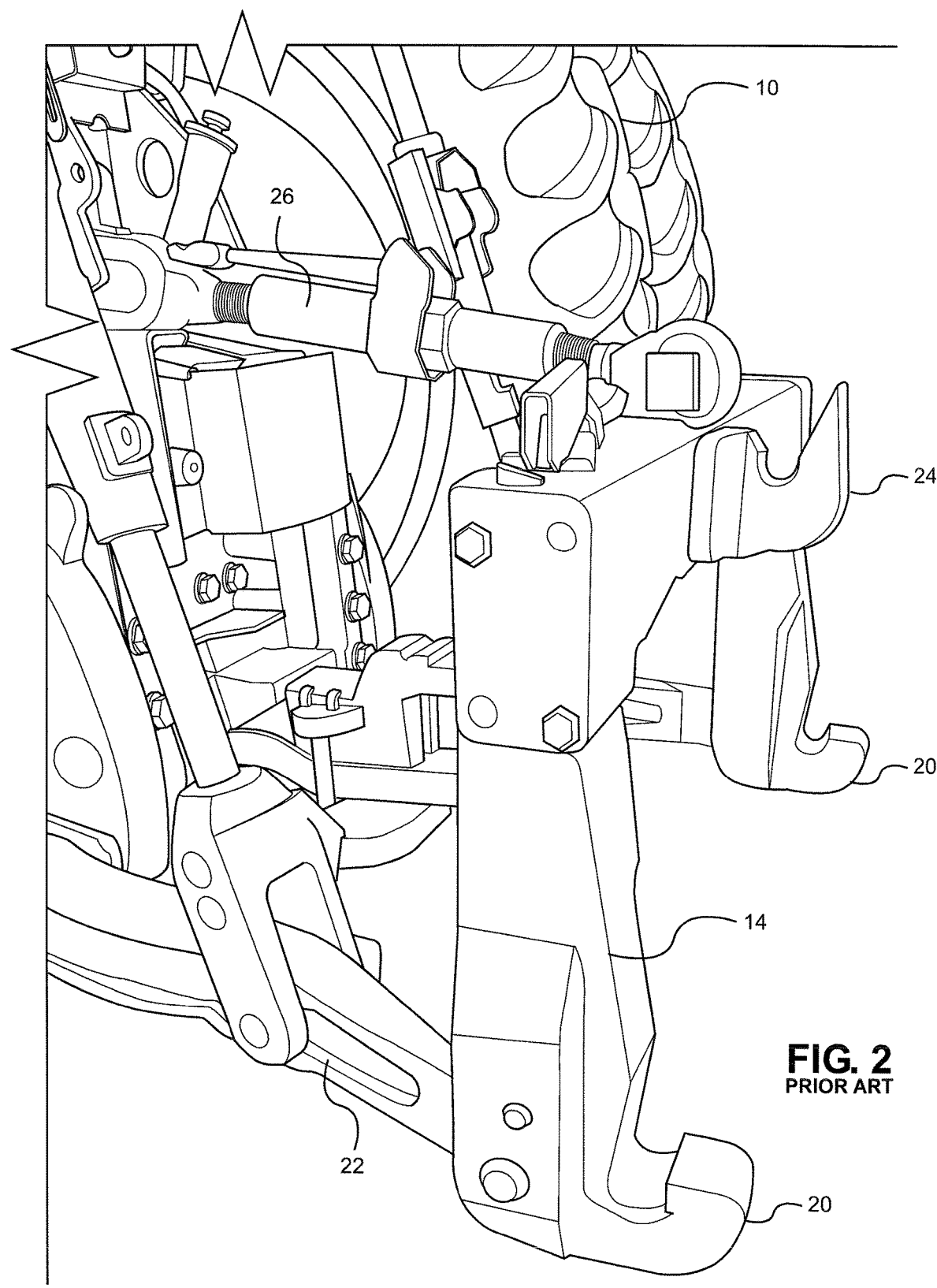
FIG. 2 is a perspective view of a three-point hitch system on a tractor.

Referring now to FIG. 2, a typical three-point hitch 14 of tractor 10 with lift hooks is illustrated. Lower lift hooks 20 are located at the end of lift arms 22, while upper lift hook 24 is located at the end of arm 26. Arms 22 are lifted up to a maximum of angle 16 (shown in FIG. 1) by one-way hydraulic cylinders (not illustrated). Gravity rather than hydraulic lowering is used in order to avoid raising the wheels of tractor 10 and causing it to lose traction.

Figure 3:
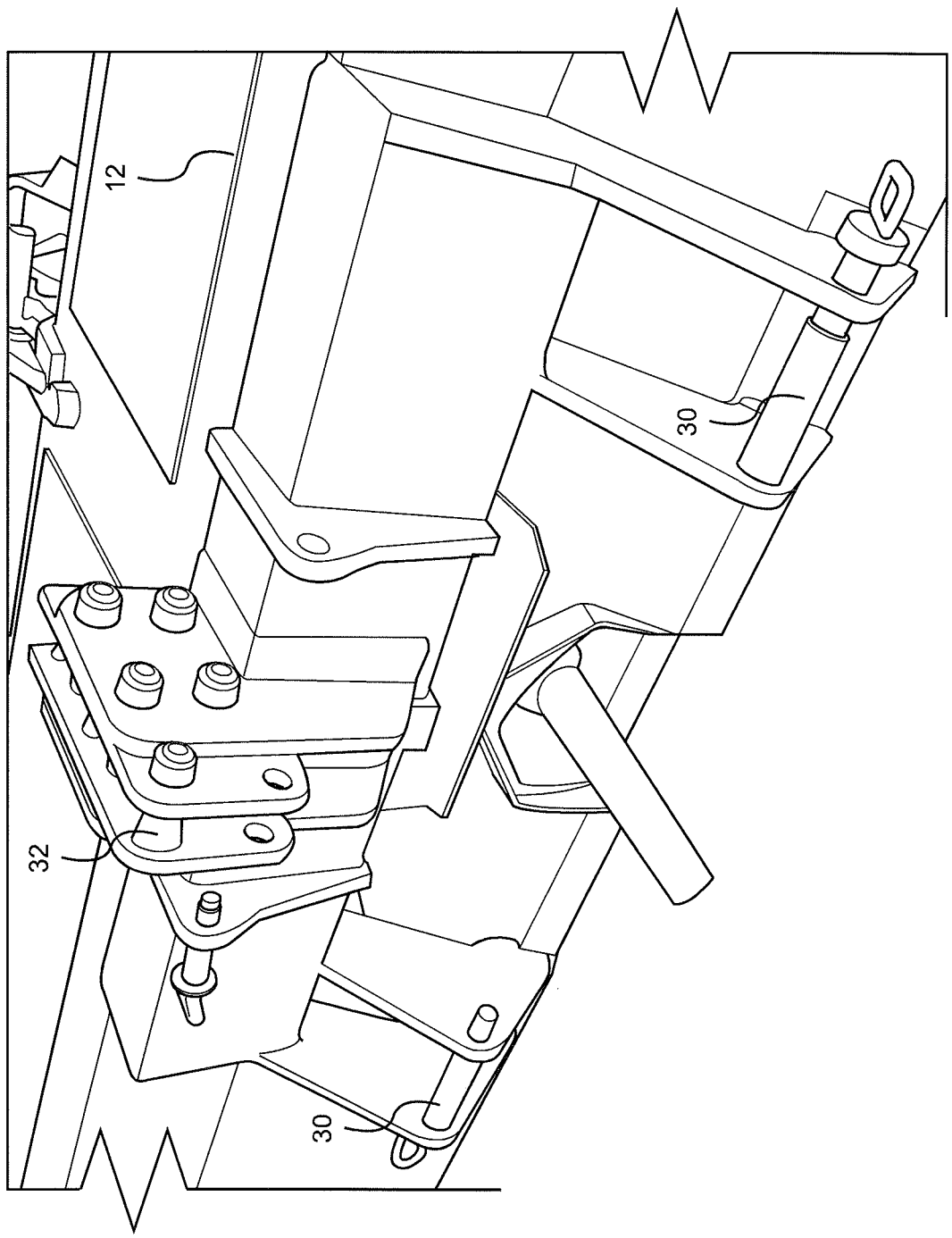
FIG. 3 is a perspective view of the connectors on an agricultural implement for a three-point hitch system.

Referring now to FIG. 3, implement 12 includes lower rod connectors 30 and upper rod connector 32 for attachment to lower lift hooks 20 (see FIG. 2) and upper lift hook 24 (see FIG. 2), respectively.

Figure 4:
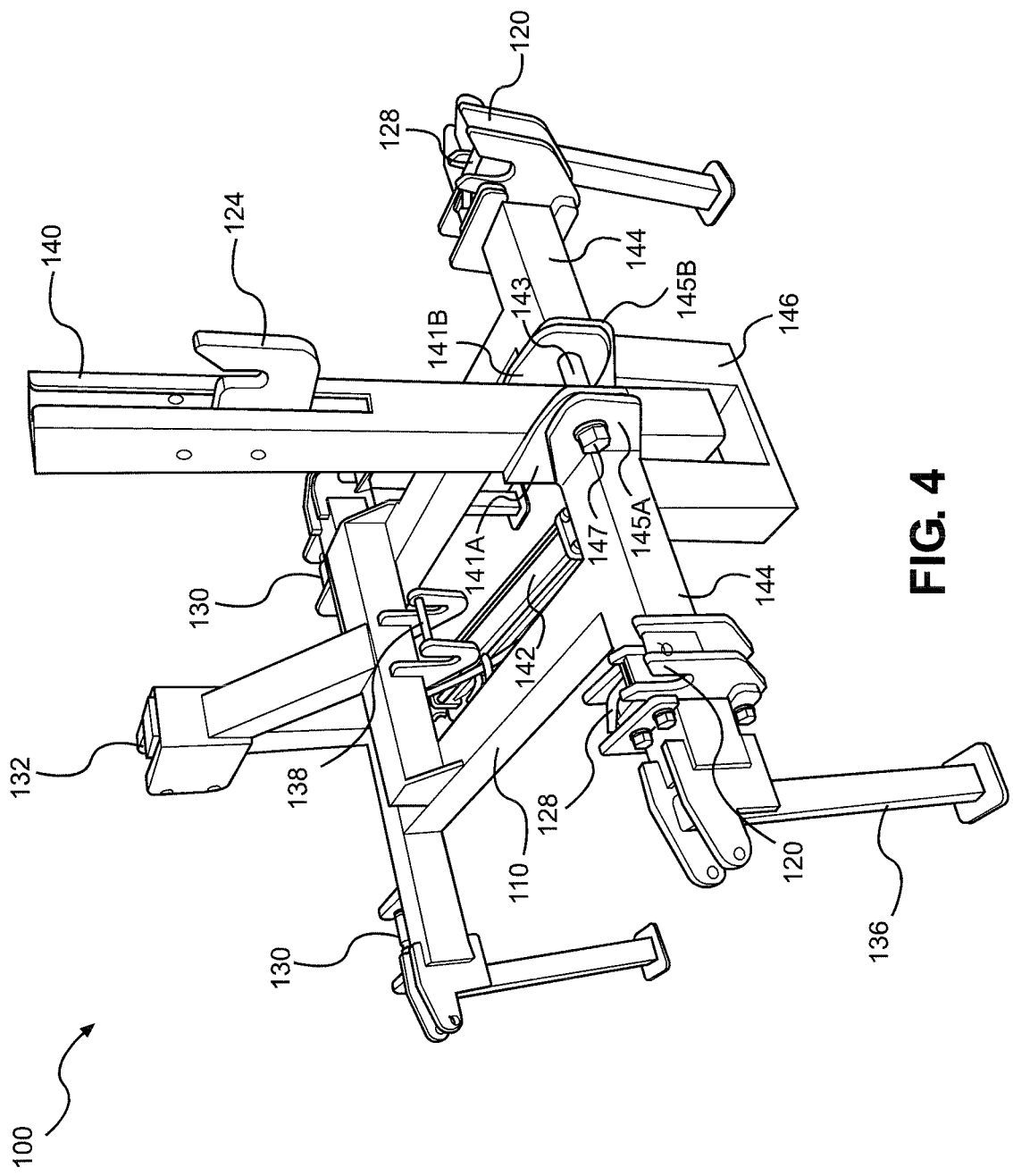
FIG. 4 is a front perspective view of a preferred embodiment of a service hitch attachment.

Referring now to FIG. 4, a preferred embodiment of a service hitch attachment is illustrated and generally designated 100. Attachment 100 has a metal body 110, with lower lift hooks 120 and upper lift hook 124 at one end for attachment to an agricultural implement 12 (not shown in FIG. 4). Locking pins 128 allow attachment 100 to be better secured to implement 12. On the opposite end, lower rod connectors 130 and upper rod connector 132 are attachable to lower lift hooks 20 and upper lift hook 24, respectively, of a tractor 10 (shown in FIG. 2).

Legs 136 fold downward into a standing configuration for storage, and can be folded outward into a raised configuration (see FIGS. 6 and 7), which is the typical configuration during use.

Upper lift hook 124 is indirectly attached to body 110 via a rotatable arm 140 that is rotated by a hydraulic cylinder 142. Rotatable arm 140 is equipped with a pair of flanges 141A and 141B formed with a bore 143. Side members 144 are equipped with a corresponding pair of flanges 145A and 145B likewise formed with a bore 143. A threaded pin, or bolt, 147 passes through bore 143 of flanges 141A, 145A, 145B and 141B to enable the rotatable arm 140 to rotate about the longitudinal axis of threaded pin 147 through the activation of hydraulic cylinder 142. Hydraulic cylinder 142 is powered by a hydraulic pump (not shown) of tractor 10 (see FIG. 2). Locking pin 138 allows rotatable arm 140 to be locked into its maximum inward rotation to secure an implement 12 (see FIG. 3) at a near-ninety-degree angle in which its underside is accessible for service.

Lower lift hooks 120 are slidably adjustable along horizontal implement-side members 144 of body 110, and upper lift hook 124 is vertically adjustable along rotatable arm 140, allowing attachment 100 to fit to the connectors of different categories of agricultural implements 12.

Bottom member 146 of body 110 extends below the rest of body 110 to rest on the ground when attachment 100 is attached to a tractor 10 (shown in FIG. 2) and lowered.

Figure 5:
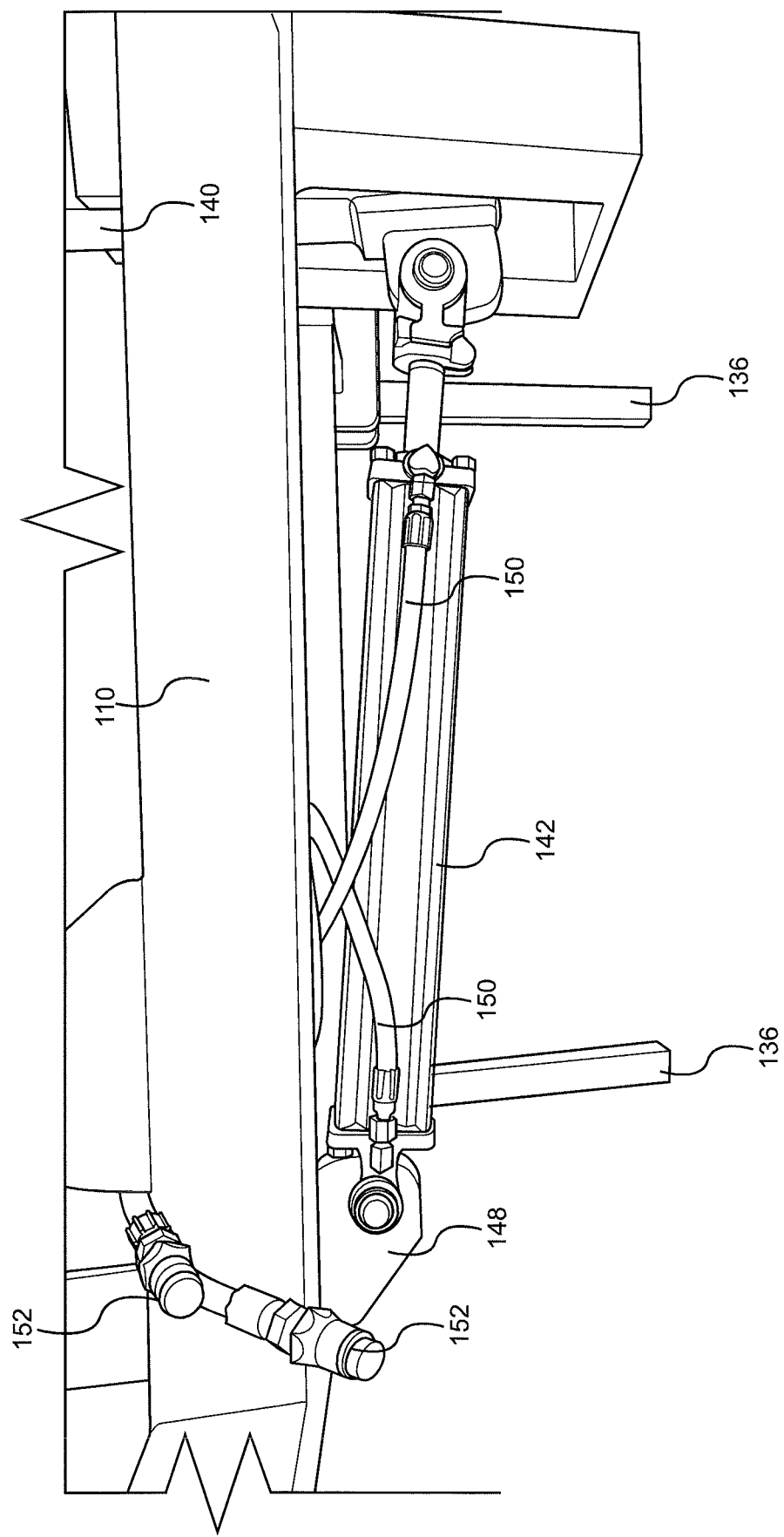
FIG. 5 is a close-up side view of the service hitch attachment, showing the hydraulic cylinder.

Referring now to FIG. 5, hydraulic cylinder 142 is attached at its rod end to rotatable arm 140, and at its barrel end to tractor-side member 148 of body 110. Hoses 150 of hydraulic cylinder 142 connect to tractor 10 (see FIG. 2) via connectors 152 in order to provide the necessary hydraulic pressure to operate cylinder 142.

Figure 6:
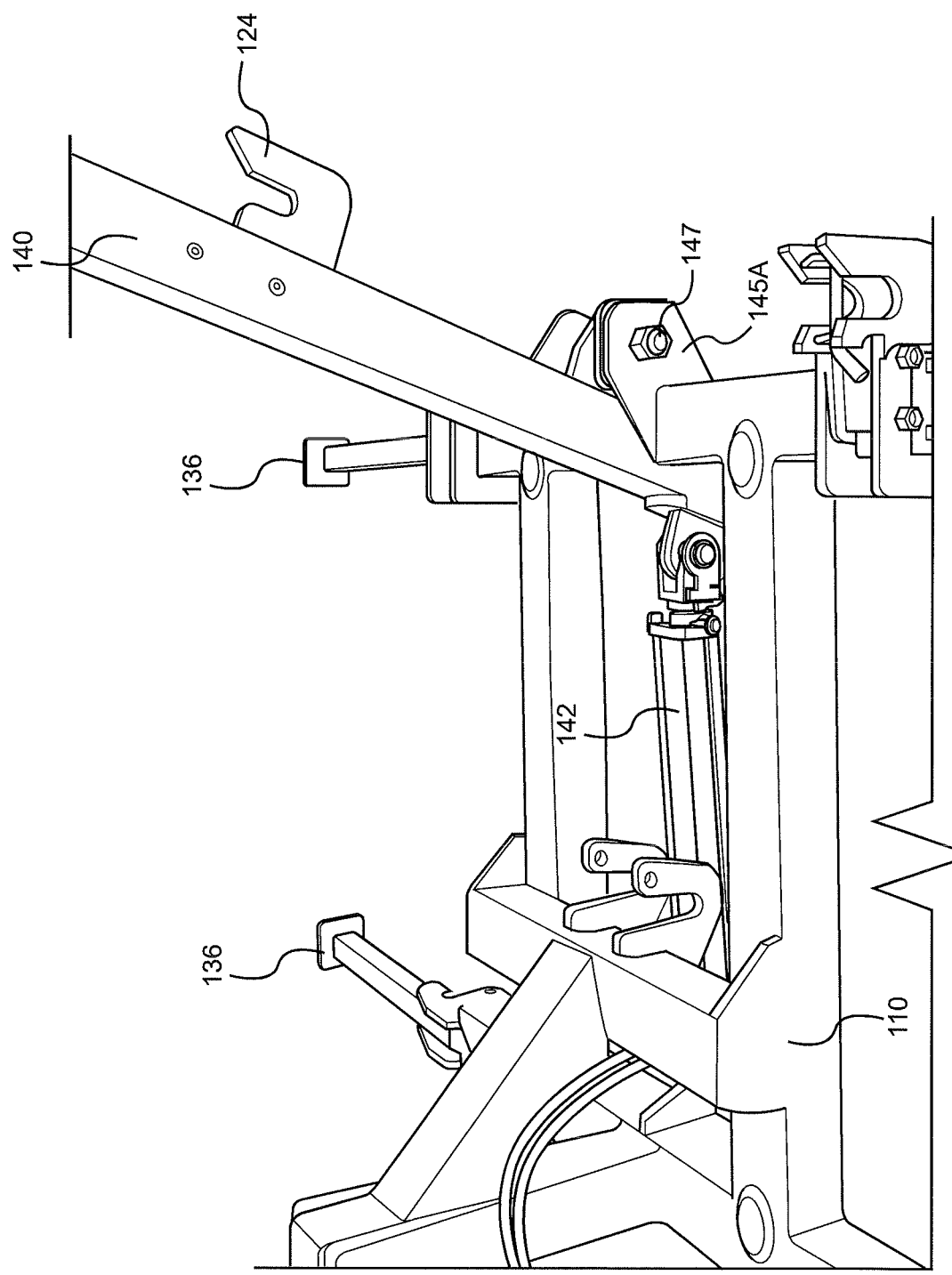
FIG. 6 is a perspective view of the service hitch attachment, showing the rotatable arm in an outward configuration.

Referring now to FIG. 6, attachment 100 is illustrated with legs 136 in the raised configuration typical for using attachment 100. Arm 140 is illustrated in its maximum outward rotation.

Figure 7:
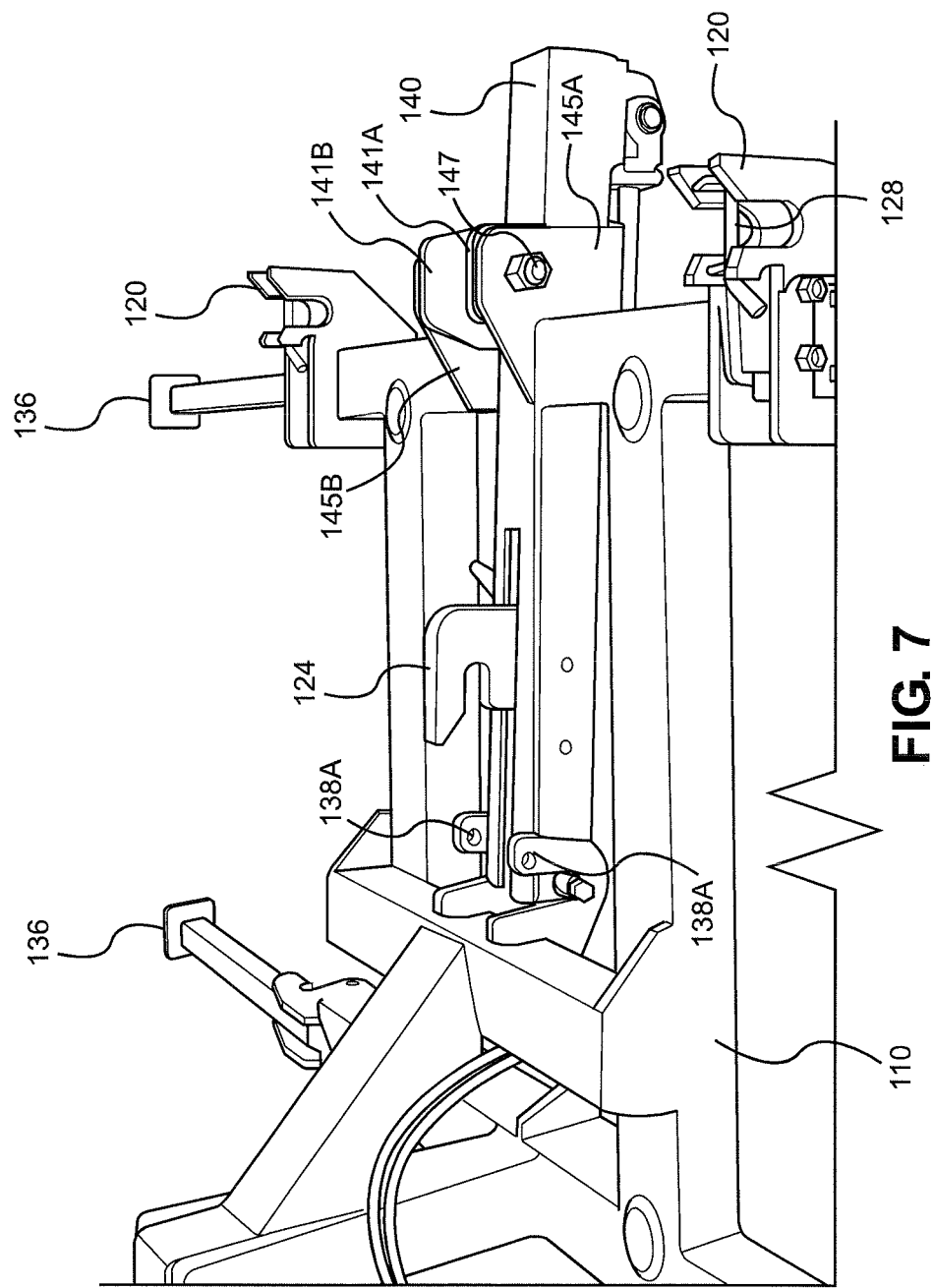
FIG. 7 is a perspective view of the service hitch attachment, showing the rotatable arm in its maximum inward configuration.

Referring now to FIG. 7, attachment 100 is illustrated with arm 140 in its maximum inward rotation, in which arm 140 is nearly parallel with the frame of body 110; in this configuration, an implement 12 (not shown in FIG. 7) attached to attachment 100 would be turned at nearly a ninety (90) degree angle. Body 110 includes two apertures 138A, into which locking pin 138 (shown in FIG. 4) can be inserted to lock arm 140 into the illustrated configuration.

Figure 8:
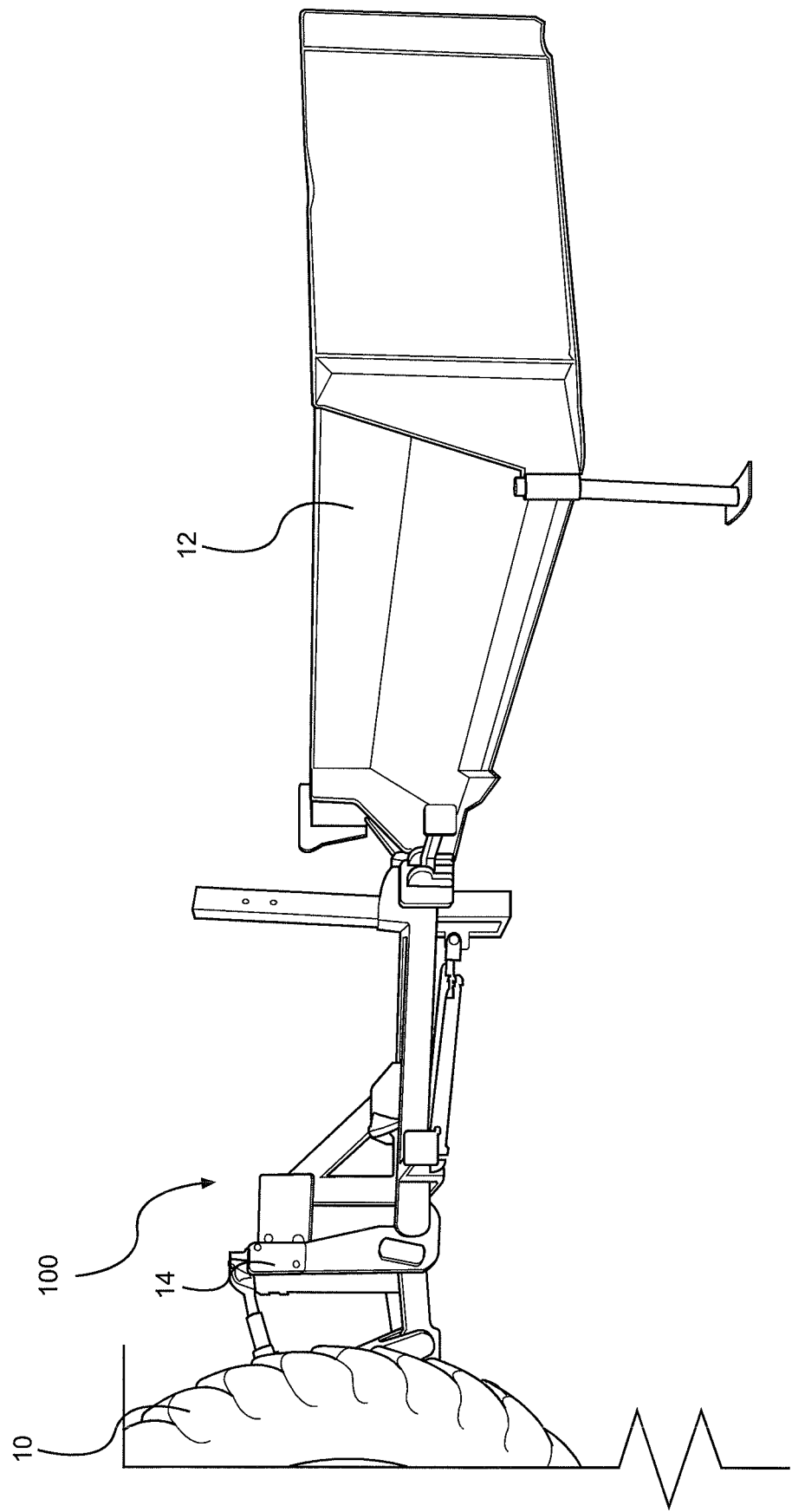
FIG. 8 illustrates the service hitch attachment attached to a tractor on its first end and an agricultural implement on its second end.

Referring now to FIG. 8, to use attachment 100, one first attaches attachment 100 to the three-point hitch 14 of a tractor 10, engaging connectors 130 and 132 (see FIG. 4) to lift hooks 20 and 24 (see FIG. 2), respectively, or to analogous connectors on tractor 10, in the same manner as an agricultural implement 12 would be connected to tractor 10. Hoses 150 (shown in FIG. 5) are connected to the hydraulic system of tractor 10. Attachment 100 is then connected to implement 12, moving tractor 10 and raising and lowering attachment 100 via three-point hitch 14 of tractor 10 so that lift hooks 120 and 124 (shown in FIG. 4) engage connectors 30 and 32 (shown in FIG. 3), respectively. Locking pins 128 are then secured to ensure a safe connection between attachment 100 and implement 12.

Figure 9:
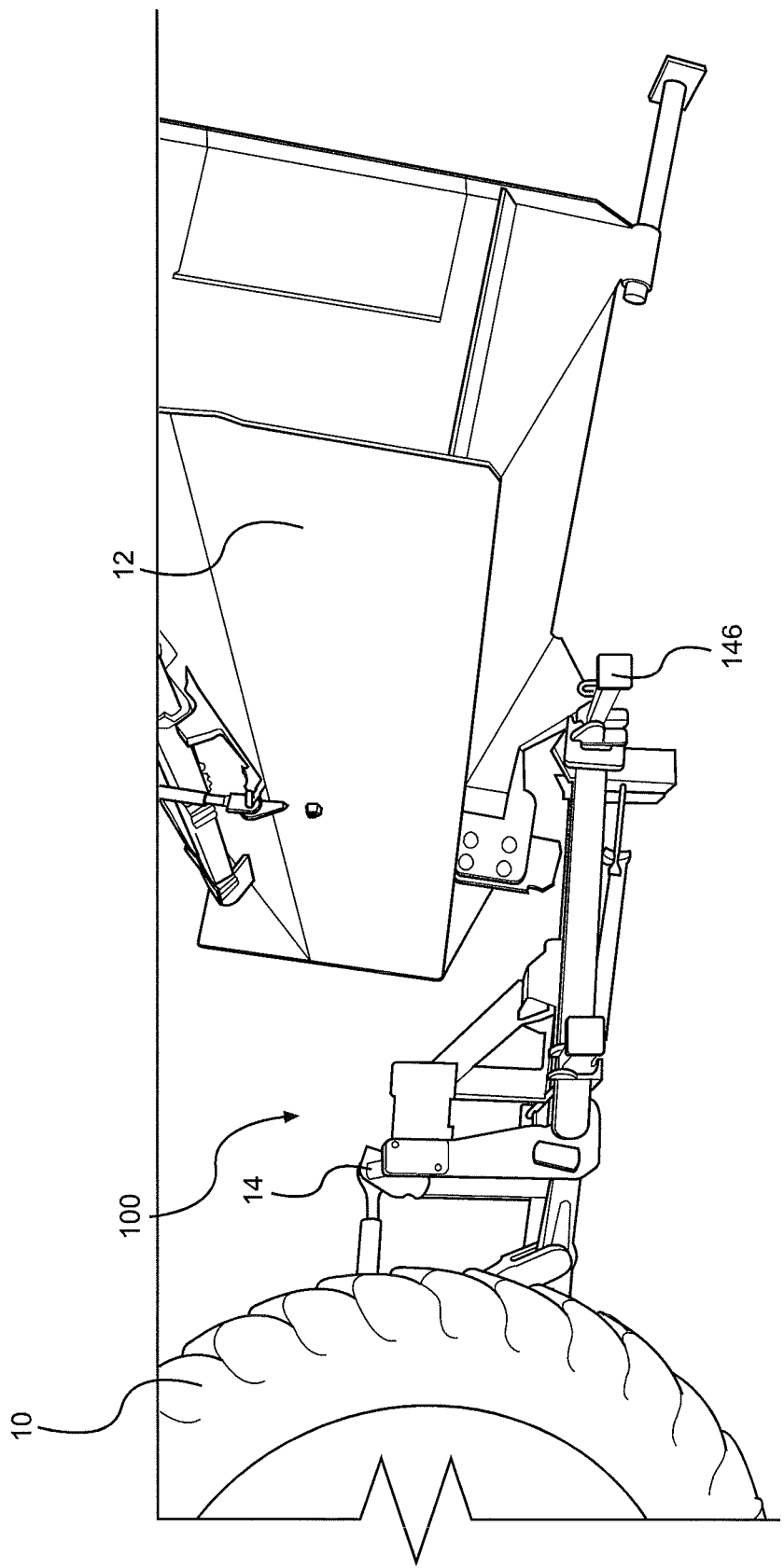
FIG. 9 illustrates the service hitch attachment having rotated the agricultural implement for inspection and servicing.

Referring now to FIG. 9, attachment 100 is shown with arm 140 in its maximum inward rotation so that implement 12 is rotated nearly ninety (90) degrees, allowing for easy access to its underside for inspection and maintenance. In order to secure implement 12 in this rotated state, locking pin 138 may be placed to prevent outward movement of arm 140. Attachment 100 has also been lowered at three-point hitch 14 so that bottom member 146 of body 110 rests on the ground, providing stability for the raised implement 12, and further increasing safety and convenience for the person servicing implement 12.

While there have been shown what are presently considered to be preferred embodiments of the present invention, it will be apparent to those skilled in the art that various changes and modifications can be made herein without departing from the scope and spirit of the invention.

What is claimed is:

1. A service hitch attachment, comprising:
    a body, comprising:
        a first end having connectors configured for attachment to a tractor hitch;
        a second end having a rotatable arm having a maximum inward rotation of at least eighty degrees and hooks; and
        a hydraulic cylinder configured to rotate the rotatable arm,
    wherein the hooks of the second end are configured for attachment to an agricultural implement, and the rotatable arm is configured to rotate the attached agricultural implement.

2. The service hitch attachment of claim 1, wherein the connectors of the first end are configured for attachment to a three-point hitch.

3. The service hitch attachment of claim 1, further comprising hoses attached to the hydraulic cylinder, the hoses configured to connect to a tractor hydraulic system.

4. The service hitch attachment of claim 1, wherein the hooks of the second end comprise:
    an upper lift hook located on the rotatable arm;
    a left lower lift hook; and
    a right lower lift hook.

5. The service hitch attachment of claim 4, wherein the left lower lift hook and the right lower lift hook are horizontally adjustable along the second end of the body, and wherein the upper lift hook is vertically adjustable along the rotatable arm.

6. The service hitch attachment of claim 5, further comprising a locking pin configured to lock the rotatable arm at the maximum inward rotation.

7. A service hitch attachment, comprising:
a metal body, comprising:
a first end configured for connection to a three-point hitch;
a plurality of foldable legs;
a second end configured for connection to an agricultural implement;
a rotatable arm located at the second end and configured to rotate the agricultural implement up to a maximum angle of at least eighty degrees; and
a hydraulic cylinder configured to rotate the rotatable arm.

8. The service hitch attachment of claim 7, wherein the plurality of foldable legs is adjustable from a standing configuration in which the legs are folded downward to a raised configuration in which the legs are folded outward.

9. The service hitch attachment of claim 7, wherein the hydraulic cylinder is configured to connect to a hydraulic system of a tractor.

10. The service hitch attachment of claim 7, wherein the hydraulic cylinder has a barrel end connected to a tractor-side member of the body and a rod end connected to the rotatable arm.

11. The service hitch attachment of claim 7, wherein the rotatable arm is securable at the maximum angle of rotation by a locking pin.

12. The service hitch attachment of claim 7, wherein the rotatable arm comprises an upper lift hook, and the second end of the body comprises a left side member with a left lower lift hook and a right side member with a right lower lift hook.

13. The service hitch attachment of claim 12, wherein the upper lift hook has a position that is vertically adjustable along the rotatable arm, the left lower lift hook has a position that is horizontally adjustable along the left side member, and the right lower lift hook has a position that is horizontally adjustable along the right side member.

14. The service hitch attachment of claim 12, wherein the lower left hook and the lower right hook each comprise a locking pin to secure the agricultural implement to the second end.

15. A service hitch attachment, comprising:
a body, comprising:
a first end having:
an upper rod connector,
a left lower rod connector,
a right lower rod connector, and
a tractor-side member;
a second end having:
a rotatable arm having an upper lift hook and a locking pin configured to hold the rotatable arm in a maximum inward rotation,
a lower left member having a lower left lift hook,
a lower right member having a lower right lift hook, and
a bottom member extending below the rest of the body;
a hydraulic cylinder having a rod end attached to the rotatable arm and a barrel end attached to the tractor-side member; and
four legs, each leg foldable between an outward raised configuration and a downward standing configuration.

16. The service hitch attachment of claim 15, wherein the lower left hook and the lower right hook each comprise a locking pin to secure an implement attached to the second end.

17. The service hitch attachment of claim 15, wherein the maximum inward rotation of the rotatable arm is at least eighty degrees.

18. The service hitch attachment of claim 15, wherein the hydraulic cylinder is configured to connect to a hydraulic system of a tractor.

19. The service hitch attachment of claim 15, wherein the upper lift hook, lower left lift hook, and lower right lift hook are slidably adjustable.

* * * * *